US006812997B2

(12) United States Patent
Kaltenbach et al.

(10) Patent No.: US 6,812,997 B2
(45) Date of Patent: Nov. 2, 2004

(54) PRINTING APPARATUS HAVING A MEDIA DEFECT DETECTION SYSTEM

(75) Inventors: Thomas F. Kaltenbach, Webster, NY (US); Scott C. Kloesz, Webster, NY (US); Otto Meijer, Wolcott, NY (US); Thomas K. Winkler, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 38 days.

(21) Appl. No.: 10/301,402

(22) Filed: Nov. 21, 2002

(65) Prior Publication Data

US 2004/0100622 A1 May 27, 2004

(51) Int. Cl.$^{7}$ ................................................ G03B 27/52
(52) U.S. Cl. .............................. 355/40; 355/30; 355/41
(58) Field of Search .............................. 355/27, 30, 40, 355/41; 396/310, 311, 567, 568, 570, 578

(56) References Cited

U.S. PATENT DOCUMENTS 2,930,228 A * 3/1960 Lawrence et al. ............ 73/159
3,671,123 A * 6/1972 Murata et al. ................ 355/97
5,745,217 A 4/1998 Factor
2002/0110269 A1 * 8/2002 Floeder et al. .............. 382/141
2002/0139273 A1 10/2002 Murata et al.

FOREIGN PATENT DOCUMENTS

JP 08 245060 1/1997

* cited by examiner

*Primary Examiner*—Rodney Fuller
(74) *Attorney, Agent, or Firm*—David A. Novais

(57) ABSTRACT

A photographic printer and a method of printing in which the printer is interfaced with a defect detection or scanning system is adapted to inspect photographic paper for defects as it is consumed by the printer. In the system and method of the present invention, when a defect is detected, the printer is enabled to either skip over the defect area or to reprint the affected image. With respect to the defect, when detected, the present invention provides either for the utilization of a defect marker, such as a hole punch, which provides a physical mark on the paper in close vicinity of the defect or an electronic device capable of transmitting the precise location of the defect to the printing section. The hole or electronic signal is recognized by the printer, to enable it to either skip the defective frames or reprint the images.

6 Claims, 6 Drawing Sheets

PRINTING APPARATUS HAVING A MEDIA DEFECT DETECTION SYSTEM

FIELD OF THE INVENTION

The present invention relates to a printing apparatus and a method of printing, wherein the printing apparatus includes a media defect detection system for detecting defects on media and controlling subsequent printing on the media.

BACKGROUND OF THE INVENTION

During the manufacture of media such as photographic paper, defects can occur on the media. Manufactured media can be inspected on a master roll before it is slit into finished rolls at a manufacturing site and can be manually inspected at a photofinishing or printing site.

Typically, media such as color paper rolls with defects that meet a certain size criteria as detected at the manufacturing site are discarded and not passed on to the photofinisher. Large-scale photofinishers can utilize 4 inch by 1800-foot rolls and can be quite inflexible on variations in roll length. The effect of this combination means that when a single defect falls within a customer roll, the entire customer roll may be discarded as waste since the defect in the media will show up on a completed print, resulting in a defective image. All other prints of the roll may be acceptable. In addition, some media defects can be of a characteristic that will not be noticeable in a finished print, potentially making all prints of that roll acceptable. Therefore, discarding an entire customer roll due to certain defects leads to waste of media.

If the defects are not detected at the manufacturing site, they will have to be detected at a photofinishing site. Typically, a manual inspection occurs at the photofinishing site. This inspection is time consuming, inefficient, and depends on the skill of an operator.

SUMMARY OF THE INVENTION

The system and apparatus of the present invention reduces unnecessary waste by precisely locating media defects and either not printing the media frames associated with those defects or identifying the prints made on those frames for rejection and making replacement prints on clean media. This prevents an entire customer roll from being discarded when a single defect is found in that roll during manufacturing. Thereafter, printing is controlled by preventing the defect from getting onto a print or by remaking the defective print.

The present invention provides for a printer or printing apparatus, which is interfaced with a defect detection system capable of precisely identifying a defect and the location of the defect on the media. With the printer of the present invention, manufactured media can be forwarded to a photofinishing site without discarding media with defects thereon. The printer of the present invention is capable of scanning the media to detect defects of a particular characteristic and providing for a physical mark on the media in close proximity of the noted defect or electronically reporting the precise location of the defect. The printer is thereby instructed to either skip over the defect frames or reprint the image frames upon which the defects will fall. In the embodiment of the invention as described above, the printer is interfaced with the defect scanning system and a defect marker or signaling device. In a further variation of the present invention, the scanning system can be off-line on a separate conveying system (i.e., a rewinder), and mark the position of the defect, so that the printer can detect it.

A preferred method of marking the location of the defect on the media involves marking it by way of a punch to form a hole in the center of the media just ahead of where the defect is located. With this approach, the printer will skip the hole and defect frames similarly to the way it skips splice frames marked with a hole. This center hole is not to be confused with the punched holes that can be at other locations on the media.

The present invention therefore provides for a printing apparatus which comprises a defect scanning section for scanning unexposed media in a media path in the printing apparatus to detect defects of a predetermined characteristic on the media; a defect marker located downstream of the defect scanning section with respect to a direction of travel of the media in the printing apparatus, with the defect marker receiving a signal from the defect scanning section indicative of a defect in the media and placing a physical mark on the media near the detected defect, such that the physical mark is associated with an image frame carrying the defect; and a printing section for printing images on the media, with the printing section being able to scan the media for the physical marks and skip the frames of the media which include the physical marks and their associated defects, such that the printing section prints images on only those frames which have no defects or physical marks.

The present invention further provides for a printing apparatus that comprises a defect scanning section for scanning unexposed media in a media path of the printing apparatus, to detect defects of a predetermined characteristic on the media; a defect marker located downstream of the defect scanning section with respect to a direction of travel of the media in the printing section, with the defect marker receiving a signal from the defect scanning section indicative of a defect in the media and placing a physical mark on the media near the detected defect, such that the physical mark is associated with an image frame carrying the defect; and a printing section for printing images on the media, with the printing section being adapted to scan the media for the physical marks and print images on the image frames, wherein images printed in frames having the physical marks and their associated defects are reprinted on defect-free media and the defective prints are discarded.

The present invention further relates to a method of printing images on media which comprises the steps of scanning media to detect a precise location of defects of a predetermined characteristic on the media; transmitting information with respect to the detected defects electronically to a printing section of a printer; and using the information to control subsequent printing of images by the printer on the media by skipping frames with the defects and printing images on defect-free media.

The present invention further relates to a method of printing images on media which comprises the steps of scanning media to detect a precise location of defects of a predetermined characteristic on the media; transmitting information with respect to the detected defects electronically to a printing section of a printer; and using the information to reprint those images which are printed on frames having defects, while tracking and discarding the prints with defects thereon.

DETAILED DESCRIPTION OF THE INVENTION

Figure 1A:
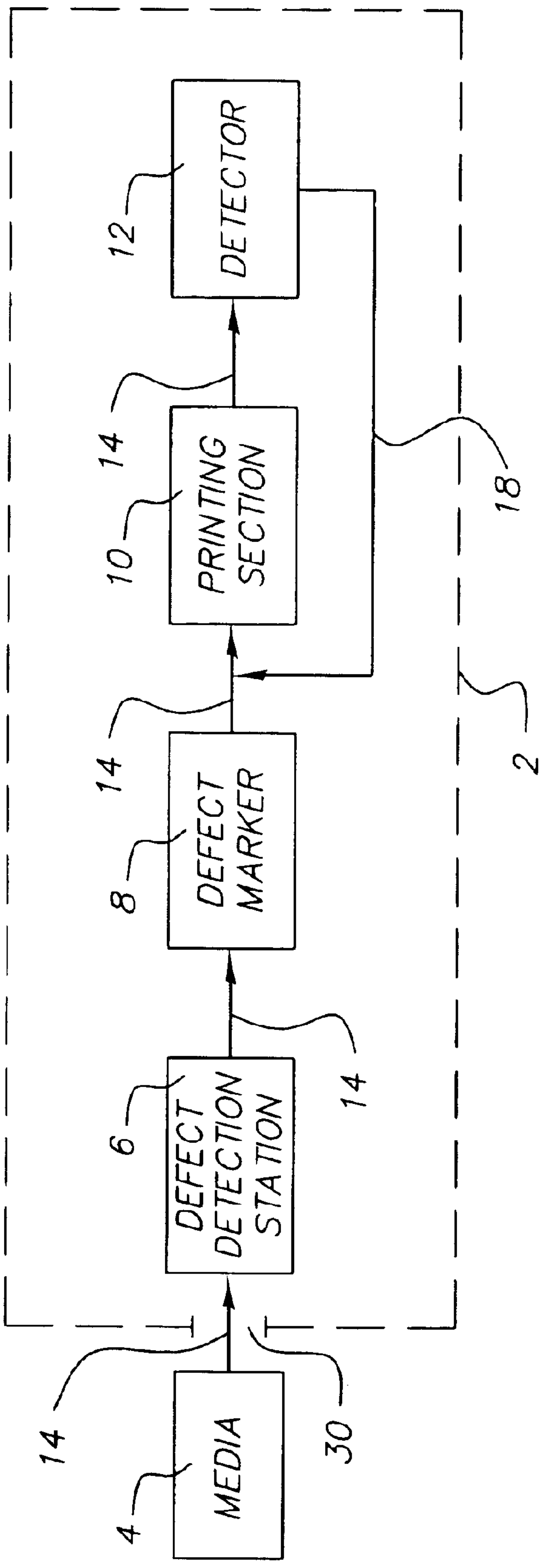
FIG. 1A schematically illustrates a printer or printing apparatus in accordance with the present invention.
Figure 1B:
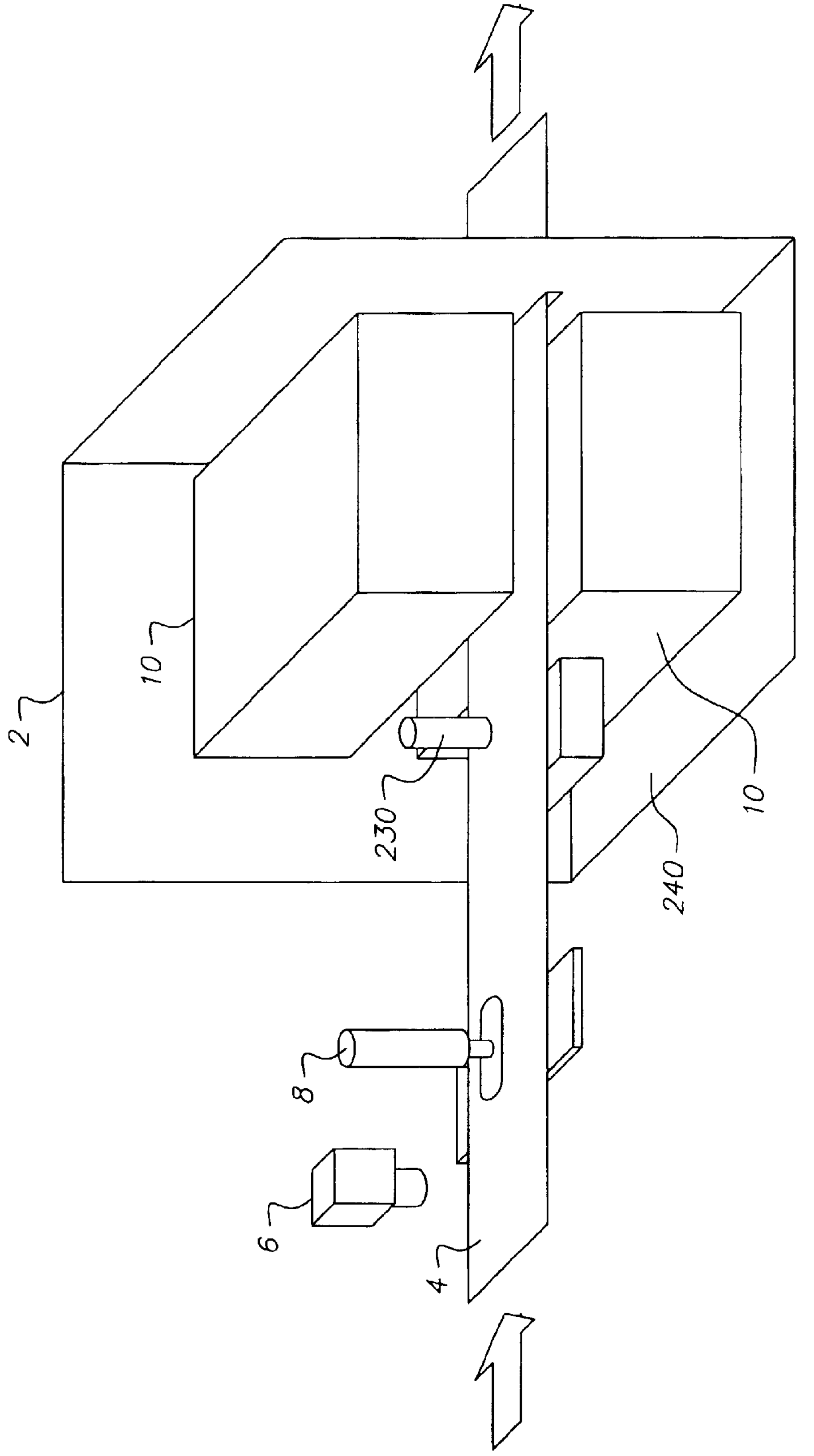
FIG. 1B is a further illustration of the printer or printing apparatus of the present invention.

Referring now to FIGS. 1A and 1B, a printer or printing apparatus 2 in accordance with the present invention is schematically shown. Printer 2 includes a media path schematically illustrated by reference numeral 14, which extends through printer 2. Media path 14 is adapted to convey media through the different sections of printer 2. Printer 2 can be a known printer, which exposes and prints on photographic paper or media.

As shown in FIG. 1A, printer 2 includes an entrance 30 for receiving unexposed photographic paper or media 4. Photographic paper or media 4 is conveyed via media path 14 to a defect detector or defect detection section 6 which is interfaced with printer 2. Defect detection section 6 can be a known scanner, or camera, which scans the entire web of unexposed media 4. For example, as shown in FIG. 1B, defect detection section 6 can comprise a video camera equipped with a lens, which images an entire frame of a web of photographic media to detect defects therein. As a further option, defect detection section 6 can include an IR light emitter, which applies IR light to the photographic media in a manner that does not alter the media's sensitivity to visible light.

With respect to defect detection section 6, the scanner or camera scans all of the frames of unexposed media 4 looking for defects of a specific characteristic. That is, there are certain defects allowed to pass through because they will not be noticeable in the final print. Examples of these are: slight surface roughness variations, extremely small point defects without a strong color contrast, and fine scratches invisible to the human eye. Multiple and repeating defects can be rejected beforehand at the manufacturing site, so that only an occasional defect must be handled by the printing system. A goal of inspection at the printer location is to eliminate random single media defects that will show up in the final print.

Defect detection section 6 can utilize an algorithm method in which the edges of the web of photographic media are detected and a digital filter is applied to enhance any defects. Thereafter, a binary image can be created to determine any bright spot defects and/or particle analysis is performed to identify the size and the position of the defects. As noted above, certain types of defects will not appear in the final print and therefore, no defect marker is needed. Those defects that are of a specific characteristic, outside of an allowable range or above an allowable limit are considered an objectional defect and accordingly, the frame of the media which includes that defect is appropriately marked.

As shown in FIG. 1A, after the web of media 4 is scanned at defect detection section 6 and any defects above a particular limit are detected, a defect marker 8 is enabled. Defect marker 8 can be a known hole puncher (see FIG. 1B) which will accordingly make a physical mark on the media in the vicinity of the defect. An example of the defect and marker are shown in FIG. 2, in which media 4 contains a punched hole 120 that is shown in the vicinity of defect 110.

Figure 2:
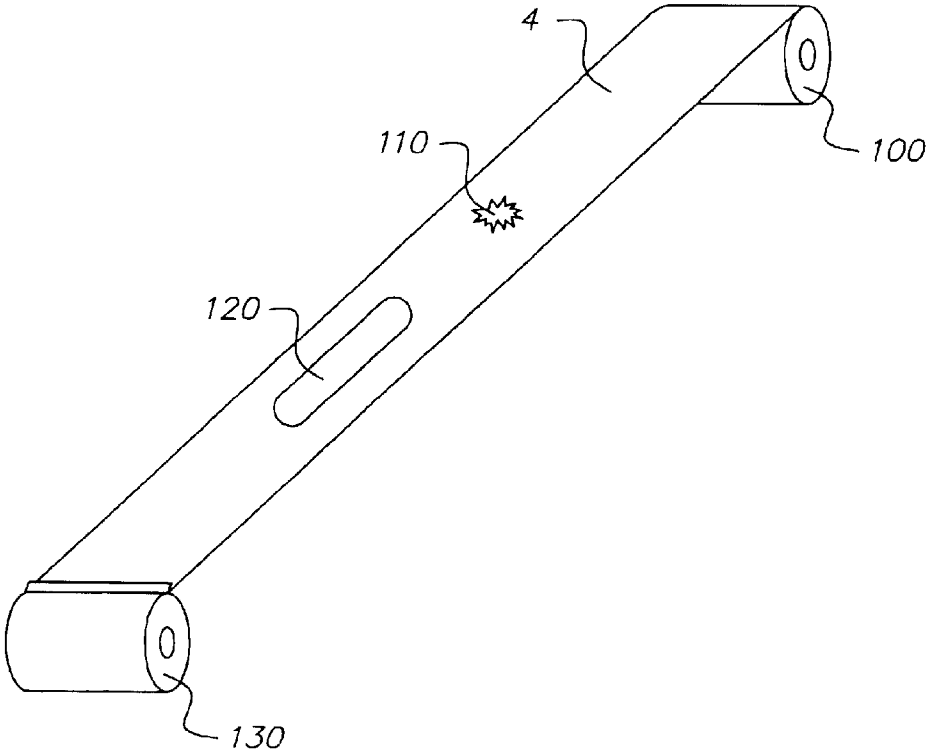
FIG. 2 is a perspective view showing an example of a defect marker on the media in the vicinity of the defect.

In the example of FIG. 2, reference numeral 100 represents an unwind or supply roll, while reference numeral 130 represents a winding or take-up roll. Defect detection section 6 is adapted to detect defect 110 on media 4 and supply a signal to defect marker 8 to provide for punched hole 120 in the vicinity of defect 110.

After defect marker 8 marks the frame of the media that includes the defect with a physical mark such as a hole, media 4 continues along media path 14 to a printing or exposure section 10 within printer 2. Printing or exposure section 10 includes a sensor (see, for example, reference numeral 230 in FIG. 1B) that would scan the media prior to exposure to check for any defect markers (such as punched hole 120). In one embodiment of the present invention, printing section 10 skips those frames that include the defects and defect markers such as physical holes, are skipped by printing section 10 and more specifically, no images are printed on those frames which include a defect or a defect marker. In the arrangement of the present invention, the defect marker would appear at random positions along the media since the markers would be at only those frames that include a defect.

Figure 3:
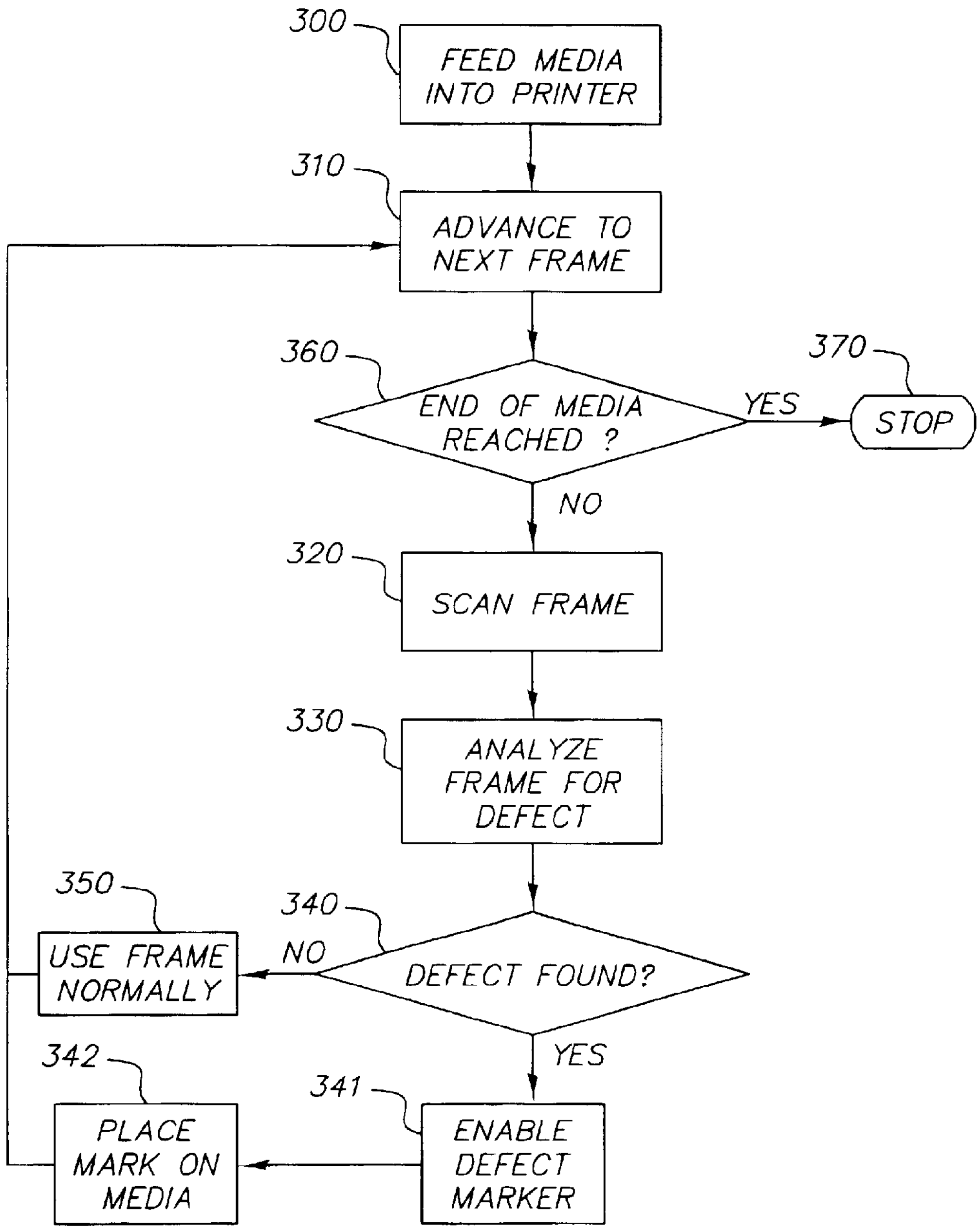
FIG. 3 is a flowchart describing a defect handling process used by the printer or printing apparatus in accordance with the present invention.

The inspection process for a given roll of media 4 is described in the flowchart of FIG. 3. The media 4 is first fed into printer 2 (step 300) and positioned prior to the first image frame. The media is then advanced to the next image frame (step 310). The media is then tested to see if the end of the roll of media has been reached (360). If the end of media has been reached, the process stops (step 370). If the end of media has not been reached, the frame is scanned (step 320) by defect detection station 6. The scanned frame is then analyzed for defects (step 330). If an objectionable defect is detected (step 340), defect marker 8 is enabled (step 341). As described, defect marker 8 is adapted to place a physical mark on the media (step 342) in the vicinity of the defect. Thereafter, the sensor in the printing section 10 can detect the physical mark and the printing section can skip the defect area by advancing the media to the next frame (step 310). If no defect is detected (step 340), the media frame is used normally (step 350). The process is then repeated by advancing to the next frame (step 310).

In a further embodiment of the present invention, printing section 10 would print the images on all the frames of the media. Thereafter, printer 2 can include a detector 12 (FIG. 1A) which will detect those printed image frames that include the defect marker, in addition to machine logic that includes defect frames with each marker frame for reprinting. At that point, those images would be sent back via path 18 for reprinting at printing section 10 (FIG. 1A).

Figure 4:
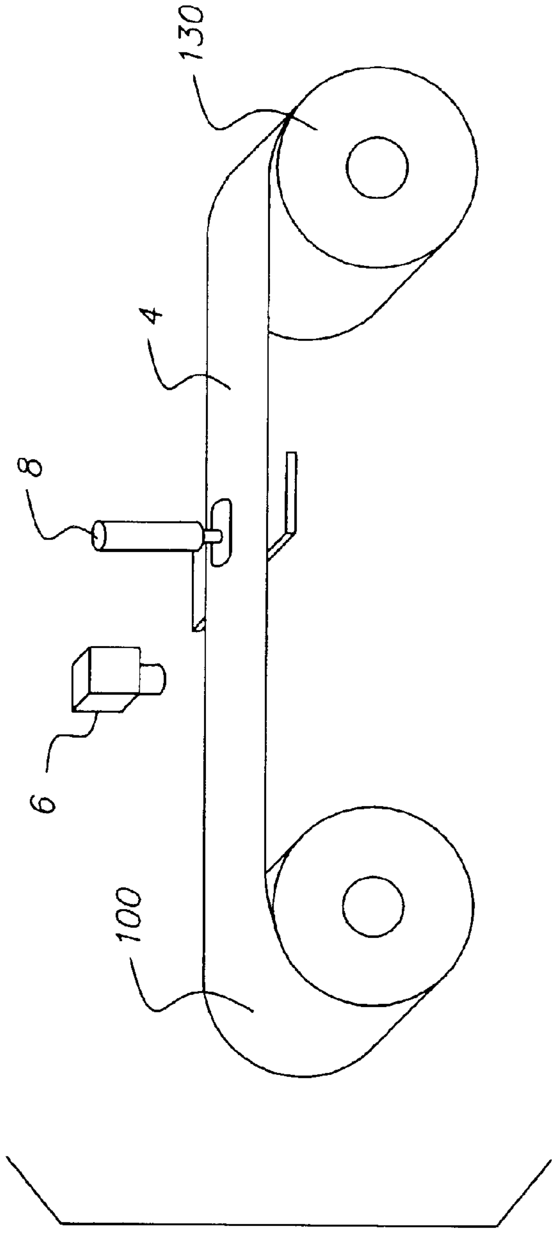
FIG. 4 is a perspective view illustrating an alternative embodiment in which the defect detection and marking system is separate from the printer or printing apparatus.

In a still further feature of the present invention, rather than having the scanner and defect marker interface with printer 2 as shown in FIG. 1A, the scanning system can be off-line on a separate conveying system, as shown in FIG. 4. In the alternative embodiment, the scanning and defect marker will mark the position of the defect as previously described. As media 4 is unrolled from unwind roll 100, it is scanned by defect detection station 6. Upon detection of a defect, defect marker 8 places a mark on the media in the vicinity of the defect position. The media is then wound up onto windup roll 130 and the process repeated until the end of roll is reached. Thereafter, the roll of media is fed into the printer and the printing section enabled to skip those frames that include defect markers and their associated defects. As a further option, the images can be printed on each of the frames and thereafter, the media is scanned to identify those images which have been printed on the frames with defect markers and defects. Those images are then reprinted as noted above.

Figure 5:
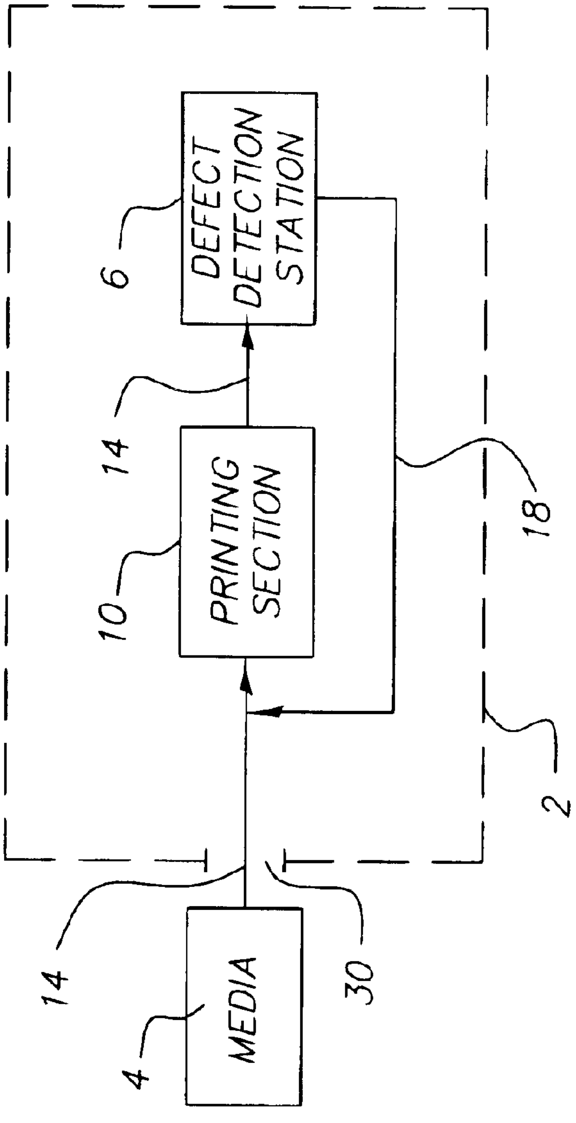
FIG. 5 schematically illustrates an alternative embodiment of the printer or printing apparatus in which exposed media is inspected for defects.

Another embodiment of the present invention is depicted in FIG. 5. In this embodiment, media 4 is fed into printer 2 through entrance 30 via media path 14, and the media is then exposed by printing section 10. Since the exposed media has not yet been developed by a photoprocessor, the printed image is not visible and the media can be inspected by defect detection station 6. When a defect is found, the affected image or images can be sent back via path 18 for reprinting at printing section 10.

Therefore, in an embodiment of the system and method of the present invention, defect detection section 6 is adapted to scan media to detect a precise location of defects. Once detected, information with respect to the detected defects can be electronically transmitted to a printing section of a printer to control subsequent printing of images by (a) skipping frames with the defects and printing images on defect-free frames, or (b) using the information to reprint those images which are printed on frames having defects, while tracking and discarding prints with defects.

With the system and method of the present invention as described above, it is possible to print on media which includes defects within allowable limits. For example, a small, low-contrast defect may be acceptable while a large, high-contrast defect would be unacceptable. Such defects can be differentiated by characteristics such as size, shape, or contrast.

The ability to utilize media rolls containing a small number of defects helps to reduce media waste. Further, it is possible to eliminate a media inspection step or process within the media-manufacturing warehouse by having printer 2 as shown above. With printer 2 of the present invention, the media is automatically inspected as it is consumed by the printer by the combination of the scanner and defect marker, and printing is subsequently controlled in consideration of the frames having defect markers thereon. For the elimination of the media inspection at the manufacturing site to be practical, however, a low frequency of defect occurrences is required.

With respect to the media of the present invention, the media is preferably non-magnetic media, and accordingly, the use of a physical mark, i.e. a punch hole, is preferred with respect to forming the mark and detecting the mark within the printer. The mark can be a hole in the center of the media, a notch at the edge of the media, or a colored mark applied with an inkjet or laser at the defect marking station. It is noted that the defect marks would be randomly occurring marks of predetermined characteristics.

The invention has been described in detail with particular reference to certain preferred embodiments thereof, but it will be understood that variations and modifications can be effected within the spirit and scope of the invention.

What is claimed is:

1. A printer comprising:

a defect scanning section for scanning unexposed media in a media path in said printer to detect defects of a predetermined characteristic on said media as said media is conveyed through said printer;

a defect marker located downstream of said scanning section with respect to a direction of travel of said media in said printing apparatus, said defect marker receiving a signal from said defect scanning section indicative of a defect in said media and placing a physical mark on said media near the detected defect, such that said physical mark is associated with an image frame which includes said defect; and a printing section for printing images on said media, said printing section being adapted to examine the media for said physical marks and skip the frames of the media which include the physical marks and their associated defects, such that said printing section prints images on only those frames which have no physical marks or associated defects on them.

2. A printing apparatus according to claim 1, wherein said physical mark is a hole punched in said media.

3. A printing apparatus comprising:

a defect scanning section for scanning unexposed media in a media path of said printing apparatus, to detect defects of a predetermined characteristic on said media;

a defect marker located downstream of said scanning section with respect to a direction of travel of said media in said printing apparatus, said defect marker receiving a signal from said defect scanning section indicative of a defect in said media and placing a physical mark on said media near the detected defect, such that said physical mark is associated with an image frame which includes said defect; and a printing section for printing images on said media, said printing section being adapted to examine the media for said physical marks and print images on said image frames, wherein images printed in frames having said physical marks and their associated defects are reprinted on defect-free media and prints with defects are discarded.

4. A printing apparatus according to claim 3, wherein said physical mark is a hole punched in said media.

5. A method of printing images on media, the method comprising the steps of:

scanning media to detect a location of defects of a predetermined characteristic on the media as the media is conveyed through a printer; and transmitting information with respect to the detected defects electronically to a printing section of said printer, and using the information to control subsequent printing of images on said media by skipping frames with the defects and printing images on frames which do not include defects.

6. A method of printing images on media, the method comprising the steps of:

scanning media to detect a location of defects of a predetermined characteristic on the media; and transmitting information with respect to the detected defects electronically to a printing section of a printer, and using the information to reprint those images which are printed on frames having defects, while tracking and discarding prints with defects.

* * * * *